No. 623,601. Patented Apr. 25, 1899.
J. HAGGLUND.
HARROW.
(Application filed July 19, 1897.)
(No Model.)
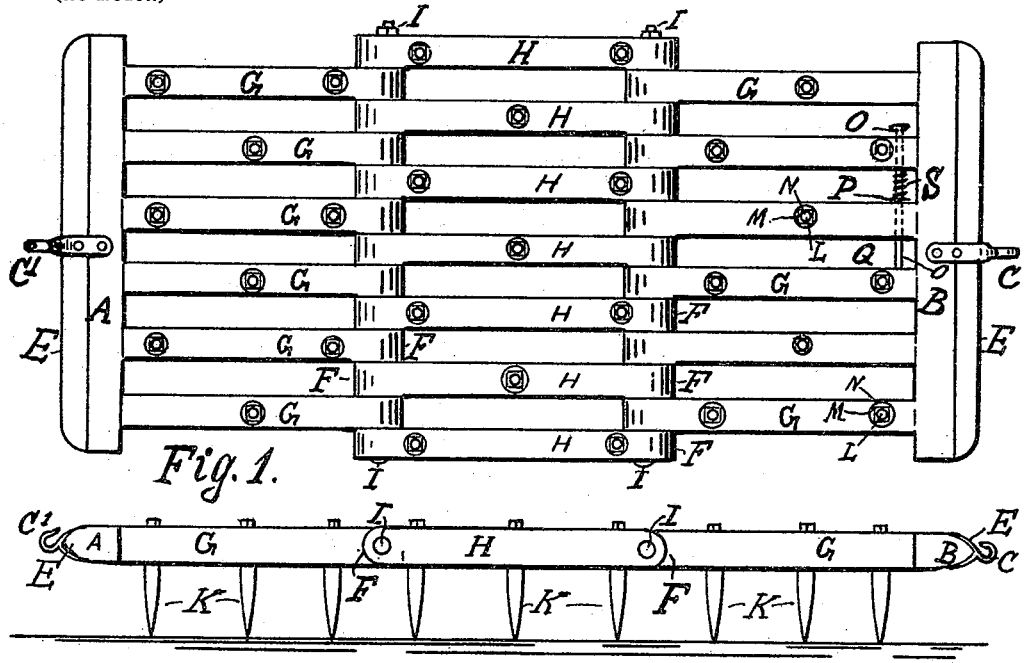
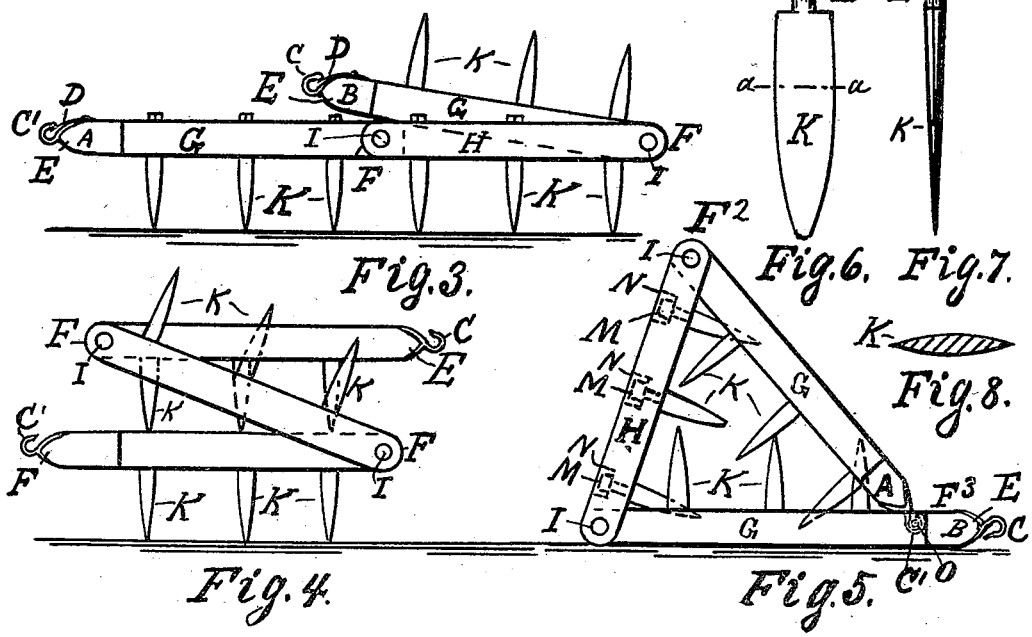
Fig. 1. Fig. 2. Fig. 3. Fig. 4. Fig. 5. Fig. 6. Fig. 7. Fig. 8.
WITNESSES:
A. Colberg
A. Carlsen
INVENTOR:
John Hagglund.
BY HIS ATTORNEY:
A. M. Carlsen

UNITED STATES PATENT OFFICE.

JOHN HAGGLUND, OF HURLEY, WISCONSIN.

HARROW.

SPECIFICATION forming part of Letters Patent No. 623,601, dated April 25, 1899.

Application filed July 19, 1897. Serial No. 645,026. (No model.)

*To all whom it may concern:*

Be it known that I, JOHN HAGGLUND, a citizen of the United States, residing at Hurley, in the county of Iron and State of Wisconsin, have invented certain new and useful Improvements in Harrows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in harrows; and the objects of my invention are, first, to provide a harrow with blade or dagger shaped teeth by which the soil may easily be cut and worked; second, to make such teeth double-edged and removable, so that they may be used with either edge forward and removed for repair, and, third, to make such harrow in several sections adapted to be folded upon one another in various ways and for purposes hereinafter set forth. These and other objects I attain by the novel construction and arrangement of parts illustrated in the accompanying drawings, in which—

Figure 1 is a top or plan view of my harrow. Fig. 2 is a side elevation of Fig. 1. Figs. 3 and 4 are side elevations of the harrow with one and with two of its sections folded up in an idle position. Fig. 5 is a side elevation of the harrow in the folded position it occupies while being drawn to and from the field or work. Fig. 6 is an enlarged detail side view of one of the harrow-teeth. Fig. 7 is an edge view of Fig. 6, and Fig. 8 is an enlarged cross-section as on the line $a\ a$ in Fig. 6.

Referring to the various parts in the drawings by letters of reference, A and B designate the transverse end bars of the frame of the harrow and are each provided at its middle with draft-hooks C and C′, by which the harrow may be drawn with either end forward. These hooks C and C′ may be provided with retaining-springs, as D. (Shown in Fig. 3.) The said end bars A and B are rounded or beveled off to almost a central edge E, so as to assist the frame in slipping over small obstructions on the ground. For like reason all the ends of the frame-bars which do not join directly into the said cross-bars A B are rounded, as shown at F F F. Permanently and rigidly secured in the end bars A and B are a series of parallel longitudinal frame-bars G G, forming the end sections of the frame. These end sections are jointed to the ends of the middle section, consisting of the bars H, by having the ends of the bars G interposed and fitted between the ends of the bars H and the pivot or joint bolts or round rods I passed through the overlapping ends of the bars. In the frame thus formed I secure at suitable points the teeth K, which consist of double-edged tapering or lancet-shaped blades having screw-threaded shanks L extending up through the bars of the harrow and provided with the nuts M, which are sunk down into the cavities N in the upper side of the bar, as best shown in Fig. 1 and to the left in Fig. 5. For a cheap grade of the harrow the nuts may, however, be placed upon the bars, as indicated in Figs. 2 and 3. In either case the teeth will be easy to remove for grinding, exchange, or other repair. All the teeth stand in a plumb position, so that their two edges may be used alternately by drawing the harrow from either end.

Near one end of the harrow I provide the sliding locking-bolt O, which by means of its transverse pin P and spring S is pressed forward into the space Q, where it engages the hook C′ of the opposite end of the harrow, and thus locks it in the folded position shown in Fig. 5, so that the driver may safely sit on the top of it at $F^2$ and place his feet at $F^3$ while driving to and from the work.

If the operator has a good strong team, he may use the entire harrow, as in Fig. 2, but if a poor team he may fold up one section of the harrow, as in Fig. 3, and if he has but a single horse, or where the sod is very tough, he may fold up the two sections, as in Fig. 4 or as in Fig. 5, only with the teeth out instead of inward, and go so many more times over the field as may be required. When the harrow is used as in Fig. 3 or 4, the idle sections serve to press the used section or sections downward, and thus make them more effective than if the idle sections were detached and separated, as in some of the old makes of harrows.

Having thus described my invention, what

I claim as new, and desire to secure by Letters Patent, is—

1. A harrow-frame comprising a central or middle section and two end sections, either of which may serve as the front end of the harrow; each of said end sections consisting of a transverse end bar and a series of parallel, longitudinal bars rigidly secured with their outer ends in the transverse bar; the middle section consisting of a series of parallel bars having their ends fitted or filling the spaces between the inner ends of the longitudinal bars of the end sections and pivotally secured thereto by two round rods or bolts extending transversely through the overlapping ends of the sections, substantially as and for the purpose set forth.

2. In a folding harrow adapted to be folded into a triangular position, the combination with the two end sections and one middle section, as shown, of the draft-hooks secured one at each end of the frame; a spring-pressed locking-bolt slidingly fitted in one of the end sections and normally traversing the space between two of the frame-bars and there engaging and securely locking one of the draft-hooks, when the frame is folded into its triangular position, substantially as shown and described and for the purpose set forth.

In testimony whereof I affix my signature in presence of two witnesses.

JOHN HAGGLUND.

Witnesses:
JAMES BLACKBURD,
F. B. HAND.